(12) United States Patent
Chen et al.

(10) Patent No.: US 8,428,003 B1
(45) Date of Patent: Apr. 23, 2013

(54) METHOD AND SYSTEM FOR WIMAX R4 AUTO-DISCOVERY AND CONFIGURATION

(75) Inventors: Liang Chen, Kanata (CA); Tao Wang, Kanata (CA)

(73) Assignee: Apple Inc., Cupertino, CA (US)

( * ) Notice: Subject to any disclaimer, the term of this patent is extended or adjusted under 35 U.S.C. 154(b) by 998 days.

(21) Appl. No.: 12/163,226

(22) Filed: Jun. 27, 2008

(51) Int. Cl.
*H04W 4/00* (2009.01)
*H04L 12/28* (2006.01)
*H04L 12/56* (2006.01)

(52) U.S. Cl.
USPC ............ 370/328; 370/331; 370/338; 370/401

(58) Field of Classification Search .................. 370/255, 370/310, 328, 338, 331, 254, 238, 392
See application file for complete search history.

(56) References Cited

U.S. PATENT DOCUMENTS

| | | | | |
|---|---|---|---|---|
| 6,483,833 | B1 * | 11/2002 | Jagannath et al. | 370/392 |
| 6,907,005 | B1 * | 6/2005 | Dahlman et al. | 370/236 |
| 6,947,669 | B2 * | 9/2005 | Wu et al. | 398/57 |
| 7,042,858 | B1 | 5/2006 | Ma et al. | |
| 7,590,421 | B2 * | 9/2009 | Ryu et al. | 455/436 |
| 2006/0291659 | A1 * | 12/2006 | Watanabe | 380/270 |
| 2007/0195764 | A1 | 8/2007 | Liu et al. | |
| 2007/0253351 | A1 * | 11/2007 | Oswal | 370/328 |
| 2007/0253434 | A1 * | 11/2007 | Oswal et al. | 370/401 |
| 2008/0139205 | A1 * | 6/2008 | Sayeedi | 455/436 |
| 2008/0279150 | A1 * | 11/2008 | Shousterman et al. | 370/331 |
| 2009/0290556 | A1 * | 11/2009 | Taaghol | 370/331 |

OTHER PUBLICATIONS

Coltun, "The OSPF Opaque LSA Option", Network Working Group, RFC 2370, Jul. 1998, pp. 1-11.
"WiMAX Forum Network Architecture", Part 0, Stage 2: Architecture Tenets, Reference Model and Reference Points, Release 1.1.1, Sep. 12, 2007, pp. 1-8.
"WiMAX Forum Network Architecture", Part 1, Stage 2: Architecture Tenets, Reference Model and Reference Points, Release 1.1.1, Sep. 12, 2007, pp. 1-32.
"WiMAX Forum Network Architecture", Part 2, Stage 2: Architecture Tenets, Reference Model and Reference Points, Release 1.1.1, Sep. 12, 2007, pp. 1-153.
"WiMAX Forum Network Architecture", Part 3, Stage 2: Architecture Tenets, Reference Model and Reference Points, Release 1.1.1, Sep. 12, 2007, pp. 1-23.

* cited by examiner

*Primary Examiner* — Derrick Ferris
*Assistant Examiner* — Kodzovi Acolatse

(57) ABSTRACT

A method is provided for the automatic discovery and updating of gateway peers within a WiMAX Access Service Network in order to control R4 intra-ASN mobility. In a preferred embodiment, When a WiMAX Access Service Network Gateway is added to the network, it propagates an AUTO-DISCOVER message using the Open Shortest Path First protocol's opaque Link State Advertisement. The received messages are used to establish connections to the sending peer based on data packaged in the Link State Advertisement. Once a connection has been established, UPDATE and CONFIRM messages are used by Access Service Network Gateways to exchange WiMAX R4 routing information. The message sequence number is used to correspond UPDATE and CONFIRM messages. The OSPF-based keep-alive mechanism is used to determine whether internal peers are reachable.

19 Claims, 18 Drawing Sheets

| Sub-TLV | Attribute | Length of Data | Mandatory/Optional |
|---|---|---|---|
| Base Station | BSID | 4/6/16 bytes | M |
| | Latitude | 4 bytes | O |
| | Longitude | 4 bytes | O |
| Paging Controller | PC ID | 4/6/16 bytes | M |
| | Paging Group ID | 4 bytes | O |
| Authenticator | Authenticator ID | 4/6/16 bytes | M |
| R4 Tunnel | R4 Tunnel Address | 4/6/16 bytes | M |

METHOD AND SYSTEM FOR WIMAX R4 AUTO-DISCOVERY AND CONFIGURATION

FIELD OF THE INVENTION

The present invention relates generally to the field of broadband wireless access data networks. More particularly, the present invention relates to updating Access Service Network Gateways ("ASG"s) in a Worldwide Interoperability for Microwave Access standard ("WiMAX") Access Service Network ("ASN").

BACKGROUND OF THE INVENTION

WiMAX is a technology based on the IEEE 802.16 standard, and aimed as providing broadband wireless data access. The WiMAX Network Reference Model specifies network functional entities and reference points that exist between various groups of network functional entities, which are typically implemented through Ethernet Layer-2 networks or IP networks. The Access Service Network represents an aggregation of functional entities and message flows associated with access services. An ASN typically includes, among other things, a plurality of Base Stations ("BS"s) and a plurality of Access Service Network Gateways. An ASG represents an aggregation of Control Plane functional entities and in some cases, Bearer Plane routing or bridging functions. Practically speaking, an ASG acts as a layer-2 traffic aggregation point within an ASN. Reference point R4 consists of Control Plane and Bearer Plane protocols that originate and terminate in functional entities of an ASN that coordinate Mobile Station ("MS") mobility between ASGs. See, for example, the *WiMAX Forum Network Architecture* (*Stage 2: Architecture Tenets, Reference Model and Reference Points*), Release 1.1.1, Sep. 12, 2007, WiMAX Forum, which is hereby incorporated by reference in its entirety.

It is necessary for ASGs to maintain an accurate and up-to-date record of R4 connectivity and routing information for the ASN in order to ensure, among other things, that MS handoff occurs properly. Therefore, changes in the R4 connectivity and routing information should be reflected as quickly as possible in an ASG's databases in order to reduce the chance of MS handoff errors. An ASG typically maintains several databases, including without limitation: an R4 peer database for ASG to ASG associations, a BS database for BS to ASG associations, a Paging Controller and Paging Group database for Paging Controllers and Paging Groups configured on ASGs, an Authenticator database for Authenticators associated with an ASG, and an R4 Tunnel Address database for R4 Tunnel Addresses configured on an ASG.

The current approach to updating an ASG's databases is to configure changes through manual or script-based use of a Configuration Manager. This is similar to approaches used in cellular networks, which also uses Base Stations to provide wireless access to mobile stations, with the Base Stations in turn controlled by some form of Base Station controller or Mobile Switching center. This approach has several problems: it lacks a mechanism for the automatic discovery of newly added ASGs; it is labor-intensive and introduces opportunity for error, since operators must reflect changes in network topology and routing information by manually configuring the databases of every ASG within the ASN; and it is a time-consuming approach which can introduce considerable delay in reflecting changes in network topology and routing information, during which MS handoff errors may occur. While such an approach is not particularly problematic for cellular networks, WiMAX networks can have many more Base stations and ASGs than conventional cellular networks.

It is, therefore, desirable to provide a simplified, cost-effective method for automatically discovering newly added peer ASGs, and updating peer ASGs with R4 connectivity and routing information.

SUMMARY OF THE INVENTION

The present invention relates to a generally to a method and system of updating Access Service Network Gateways ("ASG"s) in a Worldwide Interoperability for Microwave Access standard ("WiMAX") Access Service Network ("ASN"). Embodiments of the invention relate to automatically discovering and updating said ASGs with WiMAX R4 connectivity and routing information.

An aspect of the present invention provides, within an ASN in a WiMAX network, a method for updating peer ASGs with WiMAX R4 routing and connectivity information said method comprising: generating a message containing WiMAX R4 information; encapsulating said message in a first opaque LSA; using the OSPF routing protocol, in addition to being used to update routers' link state databases with IP routing information, to propagate said first opaque LSA; receiving said first opaque Link-State Advertisement (LSA); extracting said message from said first opaque LSA; and extracting said WiMax R4 information from said message. Said updating can be responsive to the addition of a new ASG, wherein said message is an autodiscovery message. Alternatively, and/or in addition, said updating can take the form of updating or confirm messages for other changes.

Another aspect provides a computer program product comprising a computer-readable medium having stored therein computer-executable instructions for updating peer ASGs in a WiMAX network with WiMAX R4 information, said computer-executable instructions comprising instructions for executing the methods described herein.

Another aspect provides an ASG comprising an R4 manager, a configuration manager, an R4 protocol entity and a Base Station Manager for carrying out the methods discussed herein.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION OF PREFERRED EMBODIMENTS

Generally, the present invention provides a method for automatic discovery and configuration of WiMAX R4 peers.

Figure 1:
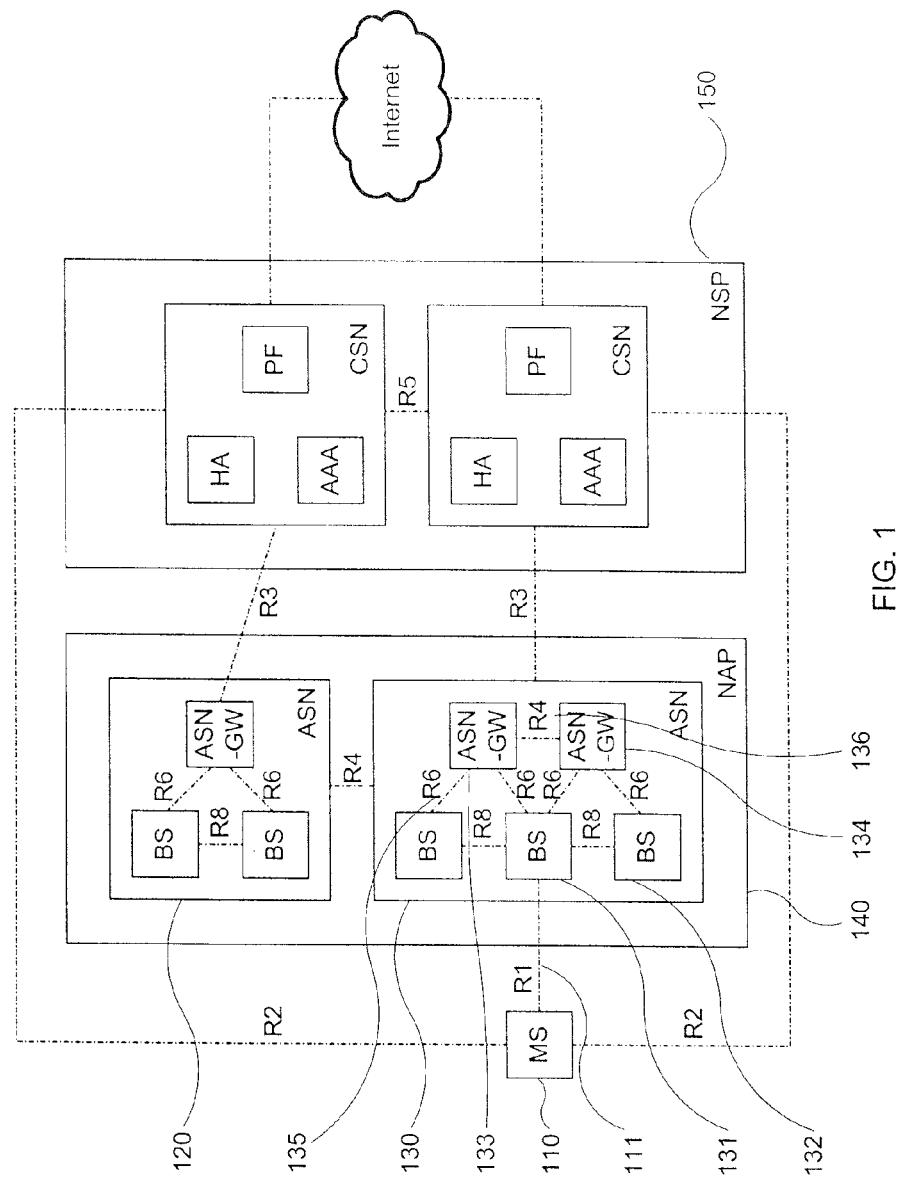
FIG. 1 is a simplified block diagram of the WiMAX Network Reference Model.

FIG. 1 illustrates a simplified block diagram of the WiMAX Network Reference Model. As will be appreciated, this WiMAX Network will be formed upon a physical network, adhering to a physical layer protocol. Network Service Provider ("NSP") 150 is a business entity that provides IP connectivity and WiMAX services to subscribers. Network Access Provider ("NAP") 140 is a business entity that provides WiMAX radio access infrastructure for one or more NSPs. NSP 150 AND NAP 140 are coupled through reference points R3. NSP 150 can include a plurality of Connectivity Service Networks (CSN), where each CSN includes a Home Agent (HA), an Authentication, Authorization and Accounting Server (AAA), and a policy function (PF). The CSN's are coupled through reference point R5. Reference point R1 111 consists of the protocols and procedures between Mobile Stations ("MS"s) 110 and Access Service Networks ("ASN"s) 120 and 130. Reference points R2 interconnect MS 110 and NSP 150. ASN 130 includes a plurality of Base Stations ("BS"s), for example BS 131 and BS 132, and a plurality of ASN Gateways ("ASG"s) 133 and 134. ASGs 133 and 134 are illustrated in further detail in FIG. 16. It should be appreciated that other BSs and ASGs (not shown) may be present. Reference point R6 135 consists of the protocols and procedures between BS 131 and ASG 134. Reference point R4 136 consists of the protocols and procedures between ASGs 133 and 134, and between ASNs 120 and 130.

In embodiments of the present invention, a message containing WiMAX R4 information is generated, and the message is encapsulated in an opaque LSA. The opaque LSA is propagated throughout the ASN using OSPF. OSPF is a hierarchical interior gateway protocol that is typically used by IP routers to distribute IP routing information. See for example, *The OSPF OPAQUE LSA Option*, RFC 2370, R. Coltun, July 1998, The Internet Society, which is hereby incorporated by reference in its entirety. However, we propose a novel use for this mechanism, which can be used by higher level devices, in this case ASG's, for propagating WiMAX network topology information in addition to the IP routing information. It should be appreciated that a WiMAX network can include a plurality of routers, in addition to, or associated with the components shown. Receiving ASGs subsequently extract the message from the opaque LSA, and the WiMAX R4 information is extracted from the message and used to update receiving ASGs' databases. Thus, in addition to using OSPF to update routers' link state databases with IP routing information, we utilize OSPF to propagate WiMAX R4 information that is used to update peer ASG databases.

Figure 2:
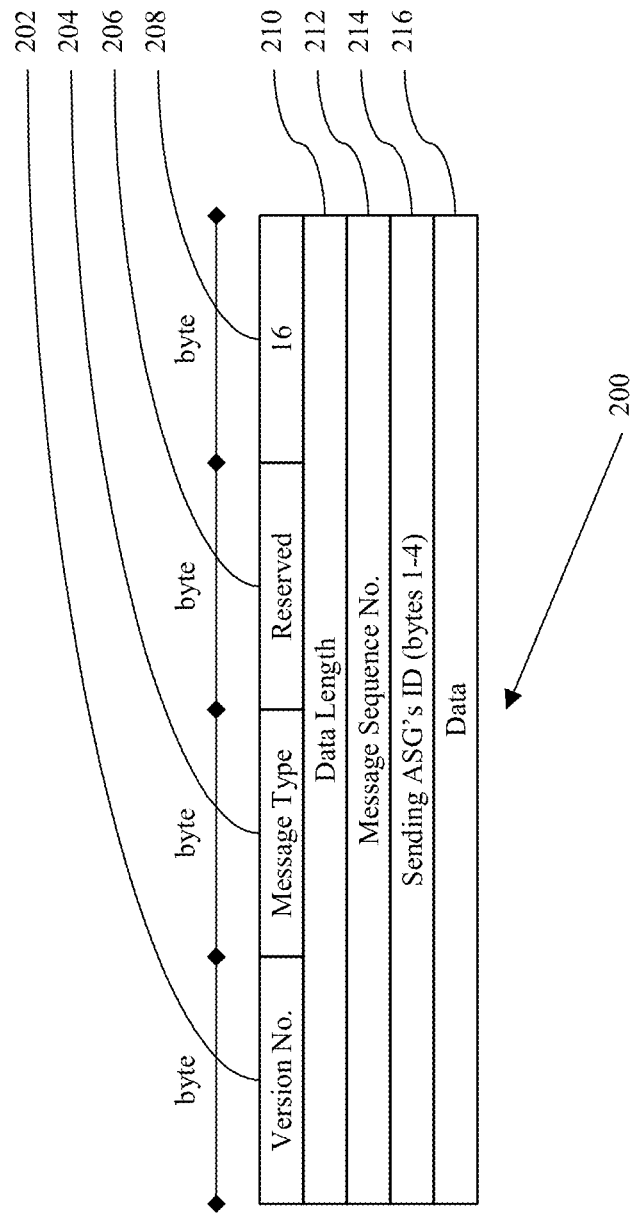
FIG. 2 is a diagram of a message format for an IPv4 ASG ID.
Figure 3:
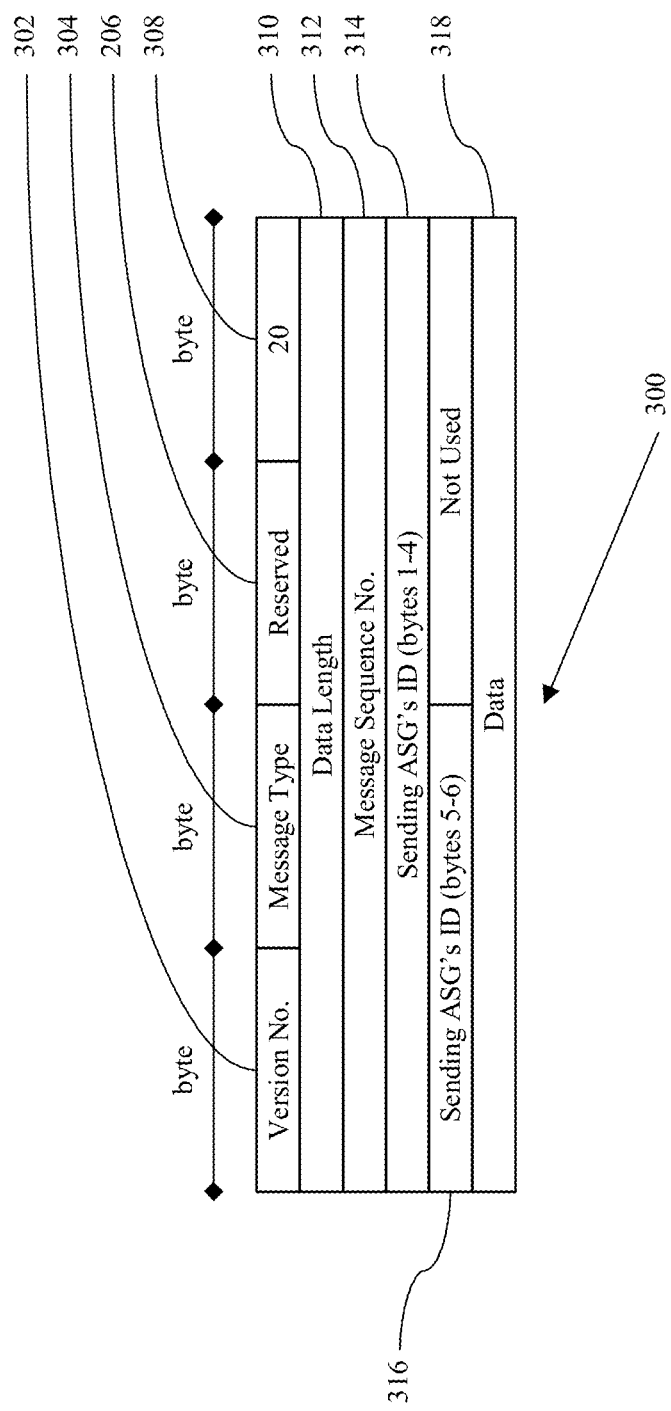
FIG. 3 is a diagram of a message format for MAC ASG ID.
Figure 4:
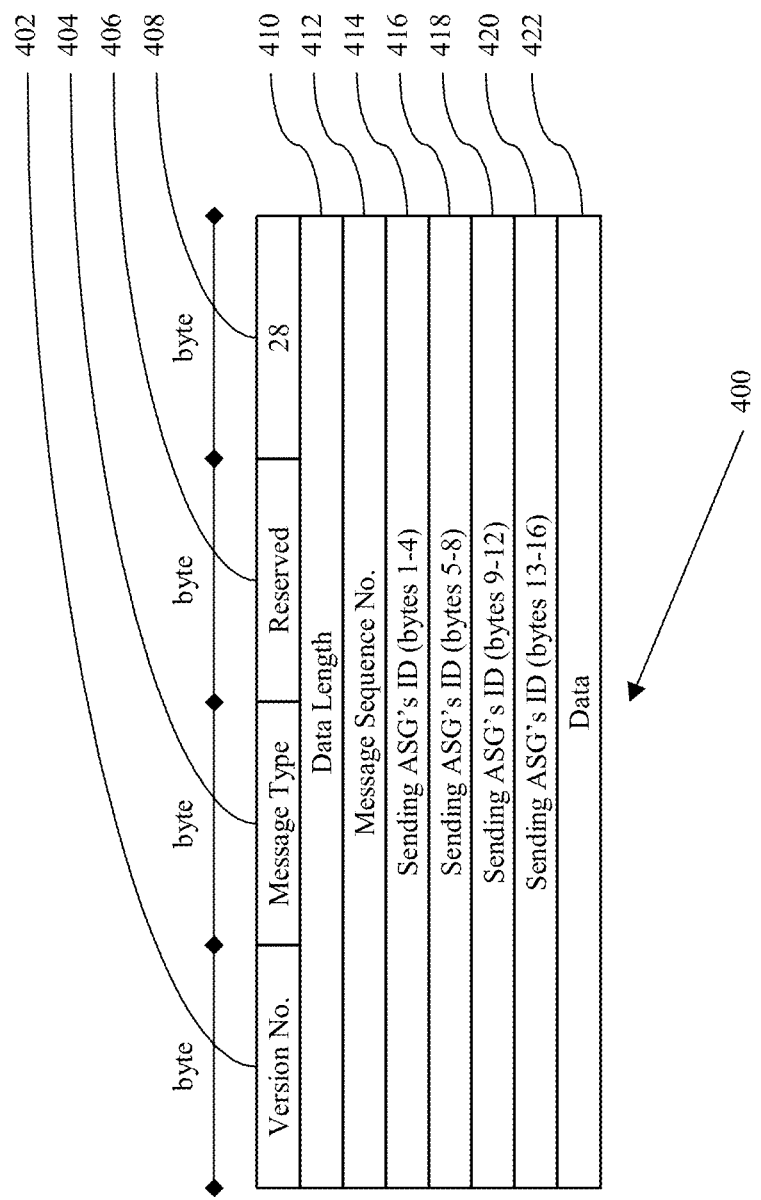
FIG. 4 is a diagram of a message format for an IPv6 ASG ID.

FIG. 2, FIG. 3 and FIG. 4 illustrate exemplary message formats for IPv4, MAC and IPv6 ASG IDs respectively, according to embodiments of the invention. Messages 200, 300, and 400 comprise a message header and data 216, 318 and 422. Both the message header and data comprise octets padded to 32-bit alignment. Fields 208, 308, and 408 indicate the size of the message header, while fields 210, 310 and 410 indicate the length of Data 216, 318 and 422 respectively. Fields 202, 302 and 402 indicate the message version. Field 214 contains the IPv4 address of the sending ASG. Field 314 and 316 contain the 6-byte MAC address of the sending ASG. Field 414, 416, 418 and 420 contain the IPv6 address of the sending ASG. Fields 206, 306 and 406 are reserved for future use.

Fields 204, 304 and 404 contains an enumerated message type which includes without limitation: AUTO-DISCOVER, UPDATE, and CONFIRM. In the case of a CONFIRM message, Data Length 210, 310 or 410 is zero and Data 216, 318 or 422 is empty. In the case of an AUTO-DISCOVER message, Data 216, 318 or 422 contains the address of the R4 interface of an ASG that has been added to the ASN. The address of the R4 interface of the ASG may be a 4-byte IPv4 address or a 16-byte IPv6 address.

In the case of an UPDATE message, Data 216, 318 or 422 contains an UPDATE message Type-Length-Value ("TLV"), and field 206, 306 or 406 is the length of the UPDATE message TLV. Field 212, 312 and 412 contains a message sequence number that is used to match corresponding messages to each other, such as a CONFIRM message to an UPDATE message.

Figure 5:
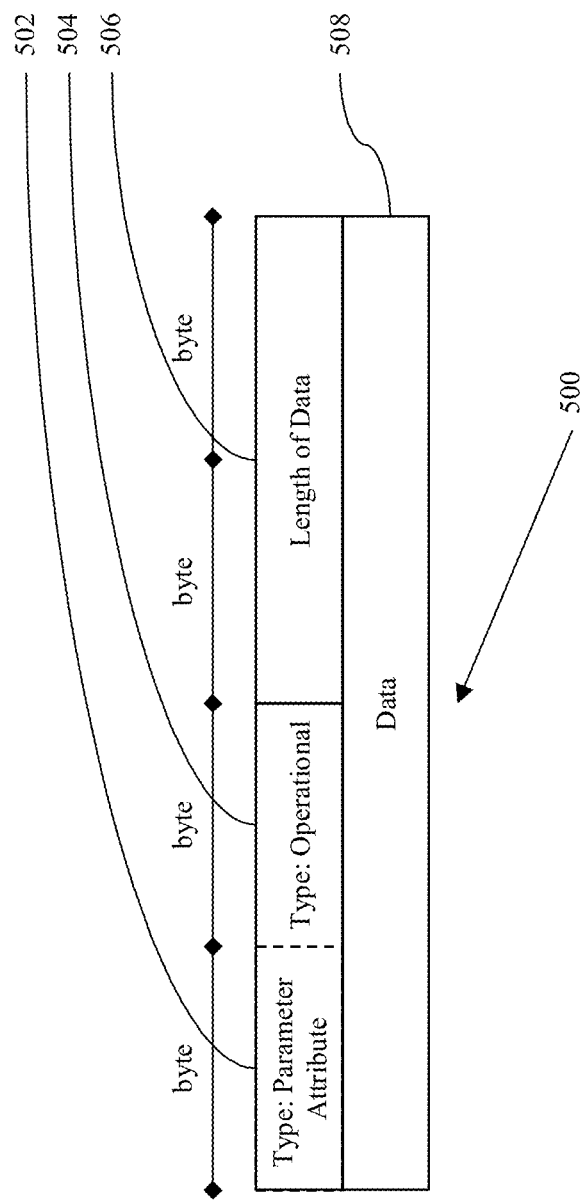
FIG. 5 is a diagram of a format for an UPDATE message TLV.

FIG. 5 illustrates the format for an UPDATE message TLV according to an embodiment of the invention. UPDATE message TLV 500 comprises octets padded to 32-bit alignment. Field 504 contains an enumerated operation type which includes, without limitation: addition; deletion; and modification. Field 502 indicates the parameter attribute types. Field 506 indicates the length of Data 508. Data 508 may contain a plurality of sub-TLV data, which are summarized in the chart 600.

Figure 6:
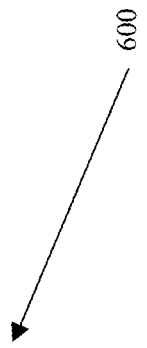
FIG. 6 is a diagram of a format for an UPDATE message TLV.

FIG. 6 illustrates a chart 600 of UPDATE message sub-TLVs according to an embodiment of the invention. The mandatory and optional attributes for each type of sub-TLV are indicated, as are length of each attribute.

Figure 7:
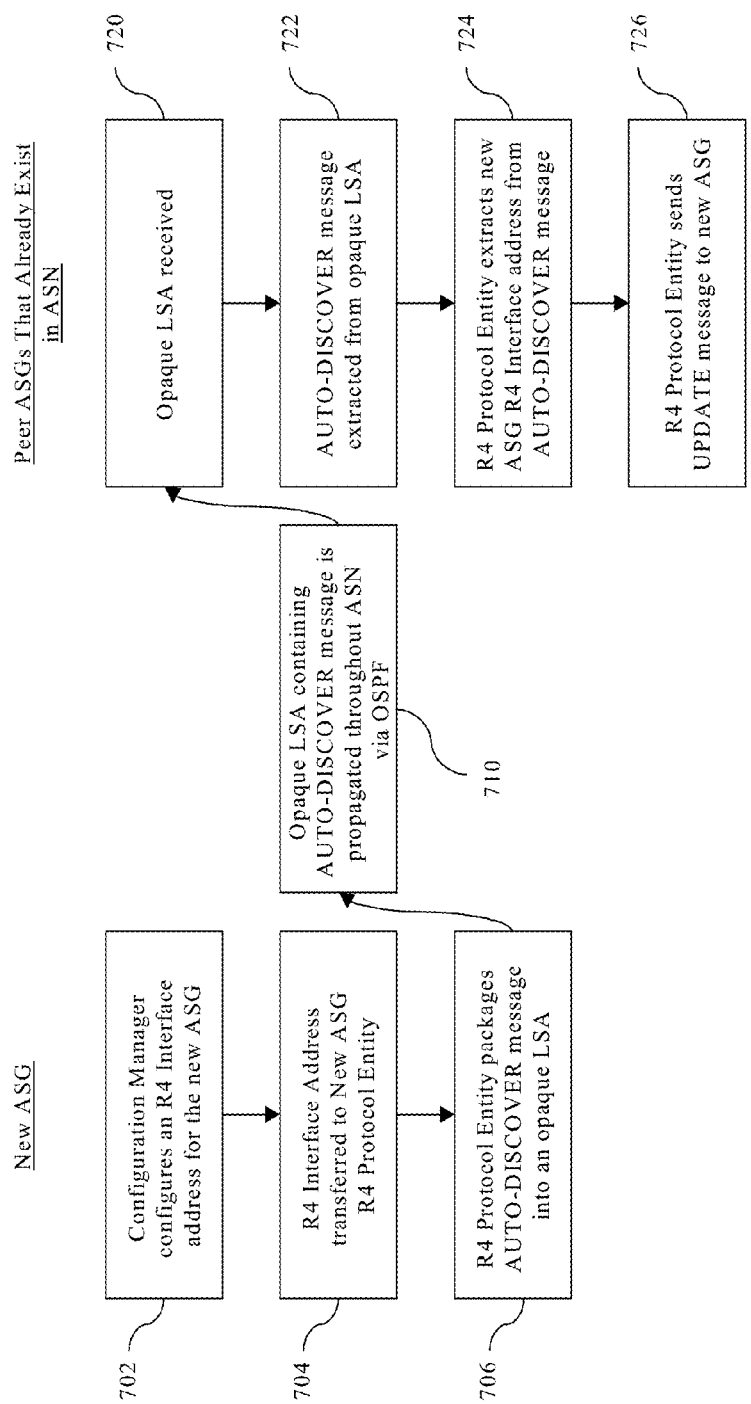
FIG. 7 is a diagram of a message format for MAC ASG ID.

FIG. 7 is a flow chart of a set of steps performed when a new ASG is added to an ASN according to an embodiment of the present invention. Firstly, an R4 Interface address is configured for the new ASG using the new ASG's Configuration Manager 1604. Next, at step 704, the R4 Interface address is transferred to the new ASG's R4 Protocol Entity 1606. The R4 Interface address is inserted into data 216, 318 or 422, of an AUTO-DISCOVER message 200, 300, or 400, and packaged into an opaque LSA at step 706. Opaque LSA type 10 with area-local flooding scope is used according to an embodiment of the present invention, although type 9 and type 11 opaque LSAs can be used for the same purpose. At step 710, the opaque LSA is propagated throughout the ASN via OSPF. OSPF is typically used to distribute IP routing information, and so most layer-3 routers support OSPF and can support this application. We propose the novel use of OSPF to be used in addition, to propagate the WiMAX R4 information.

At step 720, the Opaque LSA is received at a peer ASG, and the AUTO-DISCOVER message is extracted from the opaque LSA by the peer's R4 Protocol entity at step 722. The R4 Protocol Entity 1606 then extracts the new ASG's R4 Interface address from the AUTO-DISCOVER message at step 724, and the peer's R4 Manager 1602 can now update its R4 Peer Database 1714 to reflect the addition of the new ASG. Finally, at step 726, the peer sends an UPDATE message containing its associated R4 information to the new ASG so that the new ASG can update its databases, including its R4 Peer database 1714, R4 Tunnel Address database 1716, Paging Controller and Paging Group database 1720, and Authenticator database 1722. Once the new ASG has established connections with its peers, the OSPF keep-alive mechanism may be used to determine the availability of R4 peer ASGs.

Figure 8A:
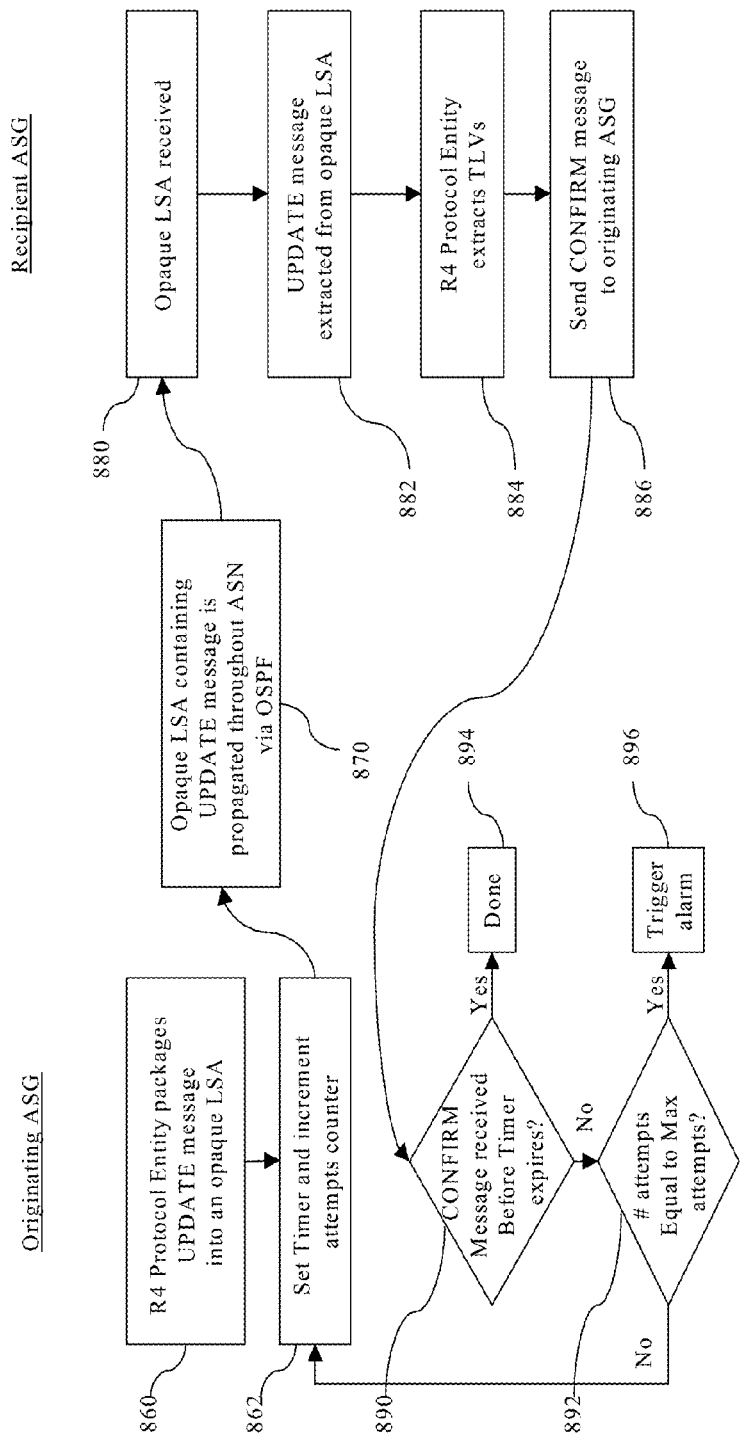
FIG. 8A is a flow chart of a set of steps performed in order to propagate an UPDATE message via OSPF and to confirm its receipt.

FIG. 8A is a flow chart of a set of steps performed in order to propagate an UPDATE message via OSPF and to confirm its receipt according to an embodiment of the invention. The R4 Protocol Entity 1606 packages the UPDATE message into an opaque LSA at step 860. The R4 Protocol Entity 1606 maintains a counter and a timer for each peer to which it attempts to communicate the UPDATE message. At step 862, the R4 Protocol Entity 1606 increments each counter and starts the timers, and the opaque LSA is then propagated throughout the ASN via OSPF at step 870.

At step 880 the opaque LSA is received by a peer ASG and the peer ASG's R4 Protocol Entity 1606 extracts the UPDATE message from the opaque LSA at step 882. Next, at step 884, the R4 Protocol Entity 1606 extracts the UPDATE message, the TLVs and the information contained therein. At step 886 the R4 Protocol Entity 1606 then generates a CONFIRM message containing the message sequence number 212, 312 or 412 extracted from the UPDATE message, and packages the generated CONFIRM message in an opaque LSA. The opaque LSA containing the CONFIRM message is propagated throughout the ASN via OSPF until, at step 890, it arrives at the ASG that originated the UPDATE message.

If the CONFIRM message is received before the timer expires then the process successfully terminates at step 894. However, if the CONFIRM message has not been received before the timer expires, the R4 Protocol Entity checks whether the maximum number of attempts has been reached in step 892. If the maximum number of attempts has not been reached, the process returns to step 862. Otherwise, an alarm is triggered in step 896.

In some embodiments, after the initial autodiscovery message has been propagated using OSPF, subsequent update and confirm messages can be sent using UDP, TCP or OSPF opaque LSA messages.

Figure 8B:
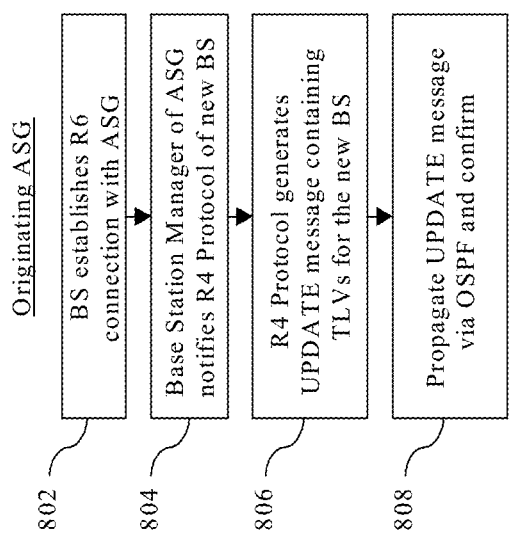
FIG. 8B is a flow chart of a set of steps performed when a BS establishes a connection with an ASG according to an embodiment of the present invention.

FIG. 8B is a flow chart of a set of steps performed when a BS establishes a connection with an ASG according to an embodiment of the present invention. Firstly, a BS establishes an R6 connection with an ASG at step 802. The ASG's Base Station Manager 1610 notifies the R4 Protocol Entity 1606 of the new BS at step 804. Next, at step 806, the R4 Protocol Entity 1606 generates an UPDATE message containing a TLV for the new BS. As indicated in 600, the TLV contains the BS ID and IP address, and optionally includes latitude and longitude. At step 808 the R4 Protocol Entity 1606 then propagates the UPDATE message throughout the ASN using OSPF and confirms its receipt, as described in FIG. 8A. The receiving peer's R4 Protocol Entity 1606 communicates the BS TLV to the peer's R4 Manager 1602, which can now use the information to update its BS database 1718.

Figure 9:
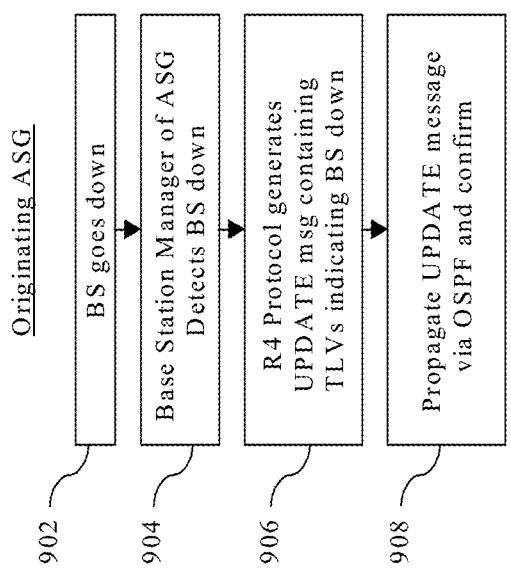
FIG. 9 is a flow chart of a set of steps performed when a BS has lost its connection with an ASG according to an embodiment of the present invention.

FIG. 9 is a flow chart of a set of steps performed when a BS has lost its connection with an ASG according to an embodiment of the present invention. Firstly, upon detecting a BS has lost its R6 connection with an ASG at step 902, the ASG's Base Station Manager 1610 notifies the R4 Protocol Entity 1606 of the lost connection at step 904. Next, at step 906, the R4 Protocol Entity 1606 generates an UPDATE message containing a TLV for the lost BS. At step 908, the R4 Protocol Entity 1606 then propagates the UPDATE message throughout the ASN using OSPF and confirms its receipt, as described in FIG. 8A. The receiving peer's R4 Protocol Entity 1606 communicates the BS TLV to the peer's R4 Manager 1602, which can now use the information to update its BS database 1718.

Figure 10:
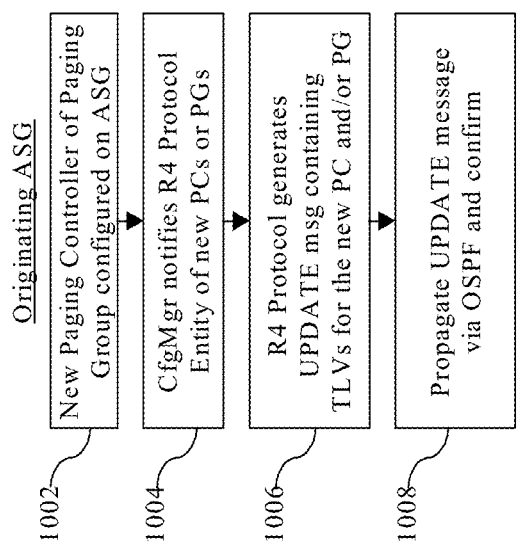
FIG. 10 is a flow chart of a set of steps performed when a PC and/or PG is added to an ASG according to an embodiment of the present invention.

FIG. 10 is a flow chart of a set of steps performed when a Paging Controller ("PC") or Paging Group ("PG") is added to an ASG according to an embodiment of the present invention. Firstly, a new Paging Controller or Paging Group is configured on an ASG at step 1002. The ASG's Configuration Manager 1604 notifies the R4 Protocol Entity 1606 of the new Paging Controller or Paging Group at step 1004. Next, at step 1006, the R4 Protocol Entity 1606 generates an UPDATE message containing a TLV for the new Paging Controller or Paging Group. At step 1008 the R4 Protocol Entity 1606 then propagates the UPDATE message throughout the ASN using OSPF and confirms its receipt, in a similar manner to that described in FIG. 8A. The receiving peer's R4 Protocol Entity 1606 communicates the Paging Controller or Paging Group TLV to the peer's R4 Manager 1602, which can now use the information to update its Paging Controller and Paging Group database 1720.

Figure 11:
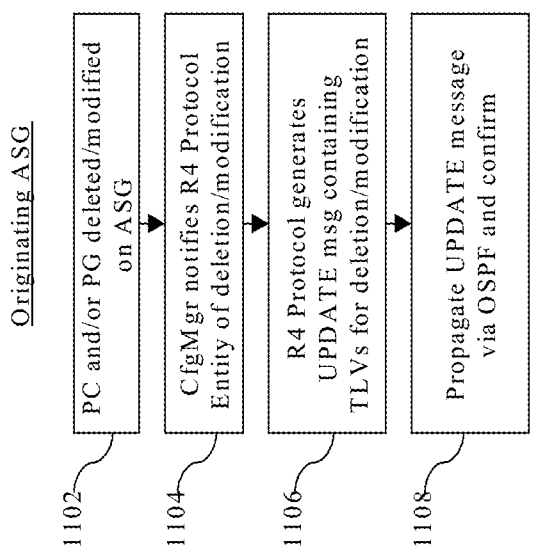
FIG. 11 is a flow chart of a set of steps performed when a PC and/or PG is deleted or modified from an ASG according to an embodiment of the present invention.

FIG. 11 is a flow chart of a set of steps performed when a Paging Controller or Paging Group is deleted or modified according to an embodiment of the present invention. Firstly, a Paging Controller or Paging Group on an ASG is deleted or modified at step 1102. The ASG's Configuration Manager 1604 notifies the R4 Protocol Entity 1606 of the deletion or modification at step 1104. Next, at step 1106, the R4 Protocol Entity 1606 generates an UPDATE message containing a TLV for the deleted or modified Paging Controller or Paging Group. At step 1108 the R4 Protocol Entity 1606 then propagates the UPDATE message throughout the ASN using OSPF and confirms its receipt, in a similar manner to that described in FIG. 8A. The receiving peer's R4 Protocol Entity 1606 communicates the Paging Controller or Paging Group TLV to the peer's R4 Manager 1602, which can now use the information to update its Paging Controller and Paging Group database 1720.

Figure 12:
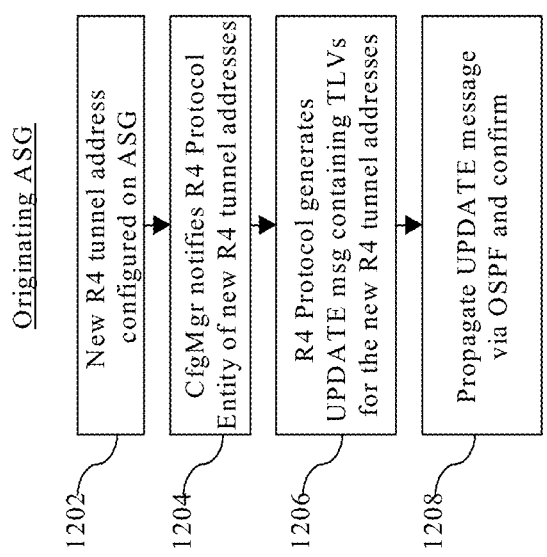
FIG. 12 is a flow chart of a set of steps performed when an R4 tunnel address is added to an ASG according to an embodiment of the present invention.

FIG. 12 is a flow chart of a set of steps performed when an R4 Tunnel Address is added to an ASG according to an embodiment of the present invention. Firstly, a new R4 Tunnel Address is configured on an ASG at step 1202. The ASG's Configuration Manager 1604 notifies the R4 Protocol Entity 1606 of the new R4 Tunnel Address at step 1204. Next, at step 1206, the R4 Protocol Entity 1606 generates an UPDATE message containing a TLV for the new R4 Tunnel Address. At step 1208 the R4 Protocol Entity then propagates the UPDATE message throughout the ASN using OSPF and confirms its receipt, as described in FIG. 8A. The receiving peer's R4 Protocol Entity 1606 communicates the R4 Tunnel Address TLV to the peer's R4 Manager 1602, which can now use the information to update its R4 Tunnel Address database 1716.

Figure 13:
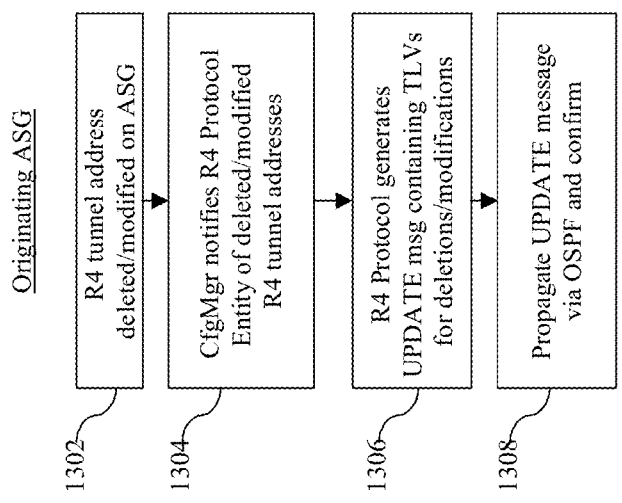
FIG. 13 is a flow chart of a set of steps performed when an R4 tunnel address is deleted or modified from an ASG according to an embodiment of the present invention.

FIG. 13 is a flow chart of a set of steps performed when an R4 Tunnel Address is deleted or modified on an ASG according to an embodiment of the present invention. Firstly, an R4 Tunnel Address is deleted or modified on an ASG at step 1302. The ASG's Configuration Manager 1604 notifies the R4 Protocol Entity 1606 of the R4 Tunnel Address deletion or modification at step 1304. Next, at step 1306, the R4 Protocol Entity 1606 generates an UPDATE message containing a TLV for the R4 Tunnel Address deletion or modification. At step 1308 the R4 Protocol Entity 1606 then propagates the UPDATE message throughout the ASN using OSPF and confirms its receipt, as described in FIG. 8A. The receiving peer's R4 Protocol Entity 1606 communicates the R4 Tunnel Address TLV to the peer's R4 Manager 1602, which can now use the information to update its R4 Tunnel Address database 1716.

Figure 14:
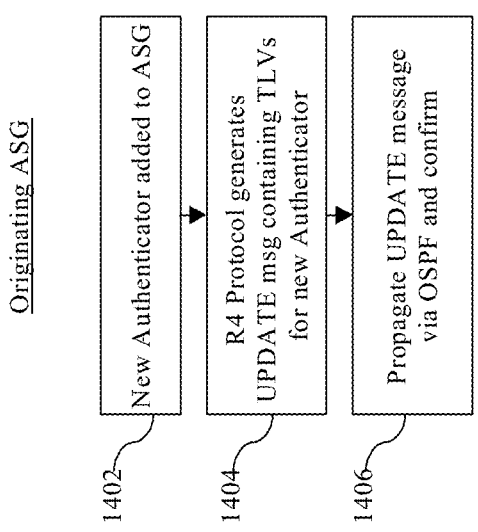
FIG. 14 is a flow chart of a set of steps performed when an Authenticator is added to an ASG according to an embodiment of the present invention.

FIG. 14 is a flow chart of a set of steps performed when an Authenticator is added to an ASG according to an embodiment of the present invention. Firstly, a new Authenticator is added to an ASG at step 1402. The R4 Protocol Entity 1606 generates an UPDATE message containing a TLV for the new Authenticator at step 1404. At step 1406 the R4 Protocol Entity 1606 then propagates the UPDATE message throughout the ASN using OSPF and confirms its receipt, as described in FIG. 8A. The receiving peer's R4 Protocol Entity 1606 communicates the Authenticator TLV to the peer's R4 Manager 1602, which can now use the information to update its Authenticator database 1722.

Figure 15:
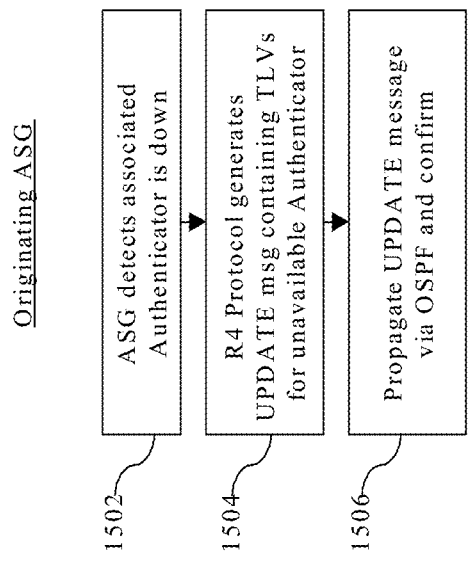
FIG. 15 is a flow chart of a set of steps performed when an Authenticator on an ASG is down according to an embodiment of the present invention.

FIG. 15 is a flow chart of a set of steps performed when an Authenticator on an ASG goes down, according to an embodiment of the present invention. Firstly, an ASG detects that an Authenticator has gone down at step 1502. The R4 Protocol Entity 1606 then generates an UPDATE message containing a TLV for the unavailable Authenticator at step 1504. At step 1506 the R4 Protocol Entity 1606 then propagates the UPDATE message throughout the ASN using OSPF and confirms its receipt, as described in FIG. 8A. The receiving peer's R4 Protocol Entity 1606 communicates the Authenticator TLV to the peer's R4 Manager 1602, which can now use the information to update its Authenticator database 1722.

Figure 16:
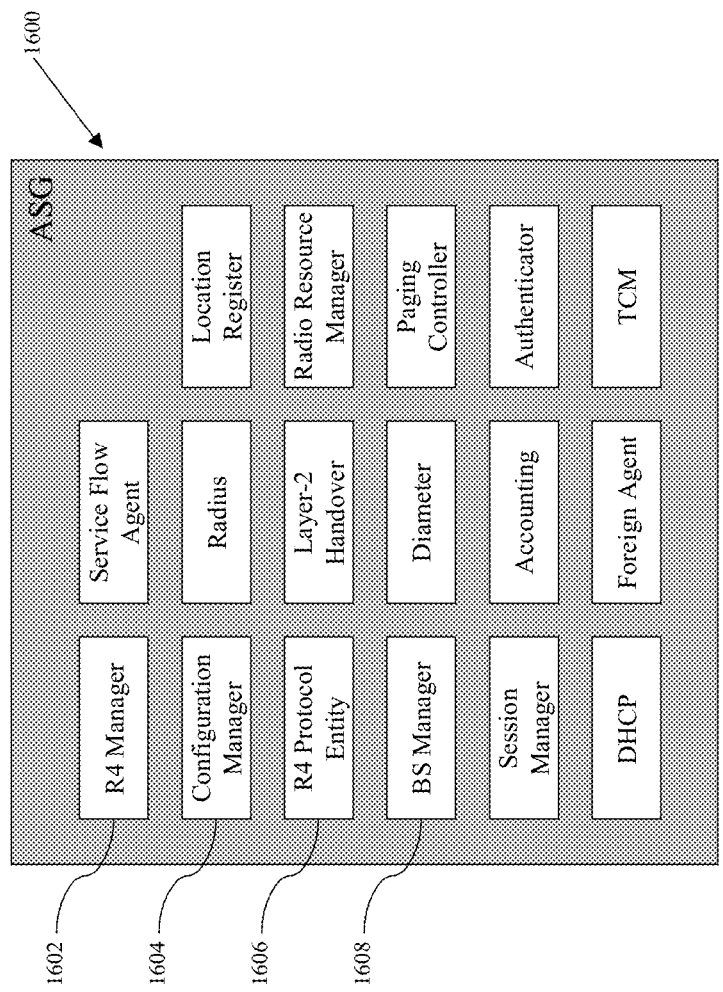
FIG. 16 illustrates a simplified block diagram of an ASG according to an embodiment of the invention.

FIG. 16 illustrates a simplified block diagram of an ASG according to an embodiment of the invention. R4 Manager 1602 maintains an ASG's R4 Peer database 1714, R4 Tunnel Address database 1716, Paging Controller and Paging Group database 1720, and Authenticator database 1722, and manages distribution of the information contained therein. R4 Manager 1602 is illustrated in further detail in FIG. 17. Configuration Manager 1604 enables manual configuration of ASGs, BSs, PCs, PGs, Authenticators, and R4 Tunnel Addresses. R4 Protocol Entity 1606 is responsible generating and processing of AUTO-DISCOVER, UPDATE, and CONFIRM messages. BS Manager 1608 monitors BSs associated with an ASG, and notifies R4 Protocol Entity 1606 of changes in the status of the BSs.

Figure 17:
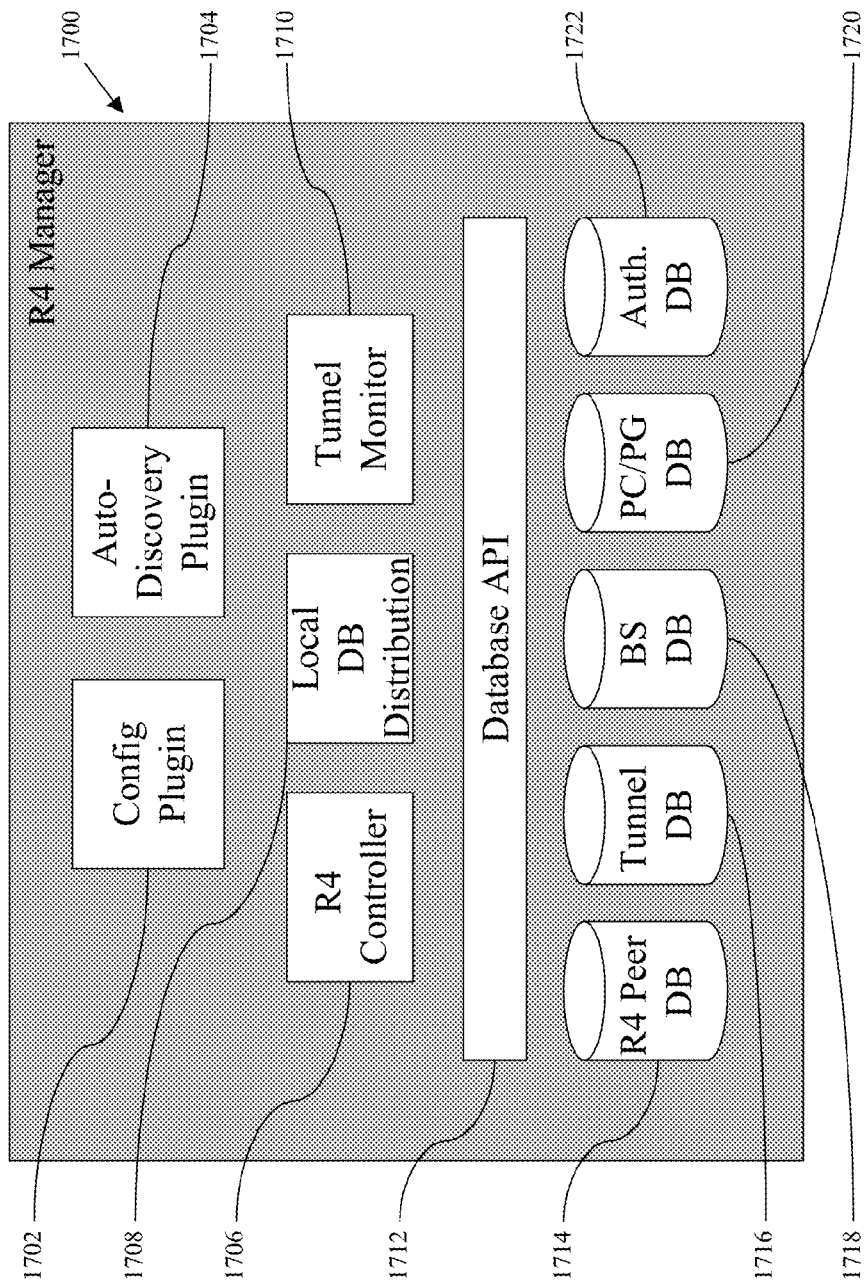
FIG. 17 illustrates a simplified block diagram of an R4 Manager according to an embodiment of the invention.

FIG. 17 illustrates a simplified block diagram of an R4 Manager according to an embodiment of the invention. Configuration Plug-in 1702 receives configuration data from configuration manager 1604 and relays it to R4 Controller 1706. Auto-Discovery Plug-in 1704 runs R4 auto-discovery protocols and communicates them to R4 Controller 1706. R4 Controller 1706 coordinates R4 information received from Configuration Plug-in component 1702 and Auto-Discovery Plug-in 1704, and updates R4 Peer Database 1714, R4 Tunnel Address 1716, BS Database 1718, Paging Controller and Paging Group database 1720, and Authenticator Database 1722.

R4 Controller 1706 also notifies Auto-Discovery Plug-in 1704 of R6 interface configuration and operational state changes, such as an R4 Tunnel Address going down or the deletion of a BS. Local Database Distribution component 1708 notifies local applications' entities of changes in the databases. Tunnel Monitor 1710 monitors R4 Tunnel Address operational states and notifies R4 Controller 1706 of state changes. Database API 1712 mediates access to information stored in R4 Peer Database 1714, Tunnel Database 1716, BS Database 1718, PC/PG Database 1720, and Authenticator Database 1722.

R4 Peer Database 1714 maintains records that include ASG to ASG associations. Tunnel Database 1716 maintains records that include R4 Tunnel Addresses configured on an ASG. BS Database 1718 maintains records that include BS information and associations between BSs and ASGs. Paging Controller and Paging Group Database 1720 maintains records of Paging Controllers and Paging Groups that are configured on an ASG. Authenticator Database 1722 maintains records of Authenticators that have been added to an ASG.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method for updating peer Access Service Network Gateways (ASGs) in a WiMAX network with WiMAX R4 information in response to an event related to a network element, the method comprising:

an ASG generating a message containing WiMAX R4 routing and connectivity information that includes Type-Length-Value (TLV) information corresponding to the event, wherein the TLV information includes an ID and IP address of the network element;

the ASG encapsulating the message in a first opaque Link-State Advertisement (LSA); and the ASG using an OSPF routing protocol, in addition to being used to update routers' link state databases with IP routing information, to propagate the first opaque LSA, wherein the first opaque LSA is usable upon receipt to extract the message from the first opaque LSA and extract the WiMAX R4 routing and connectivity information from the message.

2. The method of claim 1, further comprising:
in response to extracting the WiMAX R4 routing and connectivity information from the message, generating a confirmation message;
encapsulating the confirmation message in a second opaque LSA;
using the OSPF routing protocol to propagate said the second opaque LSA;
receiving the second opaque LSA;
extracting the confirmation message from the second opaque LSA; and
re-propagating the first opaque LSA based on the amount of time elapsed since initiating the propagation of the first opaque LSA, whether the confirmation message has been successfully extracted, and the number of attempts made to propagate the first opaque LSA.

3. The method of claim 1, wherein the network element is a new base station (BS), and wherein the event is an addition of the new BS.

4. The method of claim 1 wherein the network element is a new BS, and wherein the event is an addition of the new BS, and wherein the TLV information for the event further includes a longitude and latitude of the new BS.

5. The method of claim 1, further comprising:
generating, in response to modification of a BS's WiMax R4 routing and connectivity information, a different message containing modified WiMax R4 routing and connectivity information for the BS;
encapsulating the different message in a different opaque LSA; and
using the OSPF routing protocol to propagate the different opaque LSA.

6. The method of claim 1, wherein the network element is an existing BS, and wherein the event is a removal of the existing BS.

7. The method of claim 1, further comprising:
generating, in response to the addition of a new Paging Controller (PC) to the WiMax network, a different message containing TLV information that includes the PC's ID;
encapsulating the different message in a different opaque LSA; and
using the OSPF routing protocol to propagate the different opaque LSA.

8. The method of claim 1, further comprising:
generating in response to the addition of a new PC to the WiMax network, a different message containing TLV information that includes the new PC's PC ID and Paging Group (PG) IDs;
encapsulating the different message in a different opaque LSA; and
using the OSPF routing protocol to propagate the different opaque LSA.

9. The method of claim 1, further comprising:
generating in response to the modification of a PC's WiMAX R4 routing and connectivity information, a different message containing modified WiMAX R4 routing and connectivity information for the PC;

encapsulating the different message in a different opaque LSA; and
using the OSPF routing protocol to propagate the different opaque LSA.

10. The method of claim 1, further comprising:
generating, in response to the removal of an existing PC, a different message containing TLV information that includes the PC's PC ID;
encapsulating the different message in a different opaque LSA; and
using the OSPF routing protocol to propagate the different opaque LSA.

11. The method of claim 1, further comprising:
generating, in response to the addition of a new Authenticator, a different message containing TLV information that includes the new Authenticator's Authenticator ID;
encapsulating the different message in a different opaque LSA; and
using the OSPF routing protocol to propagate the different opaque LSA.

12. The method of claim 1, further comprising:
generating, in response to modification of an Authenticator's ID, a different message containing modified Authenticator ID information for the Authenticator;
encapsulating the different message in a different opaque LSA; and
using the OSPF routing protocol to propagate the different opaque LSA.

13. The method of claim 1, further comprising:
generating, in response to the removal of an existing Authenticator, a different message containing TLV information that includes the existing Authenticator's Authenticator ID;
encapsulating the different message in a different opaque LSA; and
using the OSPF routing protocol to propagate the different opaque LSA.

14. The method of claim 1, further comprising:
generating, in response to the addition of a new Authenticator to the WiMax network, a different message containing TLV information that includes the new Authenticator's Authenticator ID;
encapsulating the different message in a different opaque LSA; and
using the OSPF routing protocol to propagate the different opaque LSA.

15. The method of claim 1, further comprising:
generating, in response to the addition of a new R4 Tunnel, a different message containing TLV information that includes the R4 Tunnel Address of the new R4 Tunnel;
encapsulating the different message in a different opaque LSA; and
using the OSPF routing protocol to propagate the different opaque LSA.

16. The method of claim 1, further comprising:
generating, in response to modification of an R4 Tunnel's R4 Tunnel Address, a different message containing modified R4 Tunnel Address for the R4 Tunnel;
encapsulating the different message in a different opaque LSA; and
using the OSPF routing protocol to propagate the different opaque LSA.

17. The method of claim 1, further comprising:
generating, in response to the removal of an existing R4 Tunnel, a different message containing TLV information that includes the R4 Tunnel's R4 Tunnel Address;

encapsulating the different message in a different opaque LSA; and using the OSPF routing protocol to propagate the different opaque LSA.

18. The method of claim 1, further comprising:

generating in response to the addition of a new ASG to the WiMax network, a different message and wherein the different message is an autodiscovery message comprising an R4 Interface address for the new ASG.

19. A computer program product for updating peer Access Service Network Gateways (ASGs) in a WiMAX network with WiMAX R4 information, the computer program product comprising a non-transitory computer-readable medium having stored thereon computer-executable instructions that, if executed by a computing device, cause the computing device to perform operations including:

generating a message containing WiMAX R4 routing and connectivity information that includes Type-Length-Value (TLV) information relating to a network element associated with the WiMAX network, wherein the TLV information includes an ID and IP address of the network element;

encapsulating the message in a first opaque Link-State Advertisment (LSA);

using an OSPF routing protocol, in addition to being used to update routers' link state databases with IP routing information, to propagate the message.

* * * * *